Aug. 23, 1932.  C. MAUL  1,873,444
RUNNING GEAR FOR MANURE SPREADERS OR OTHER VEHICLES
Filed Jan. 20, 1930  3 Sheets-Sheet 1

Inventor
Christian Maul
By Popp & Powers
Attorneys

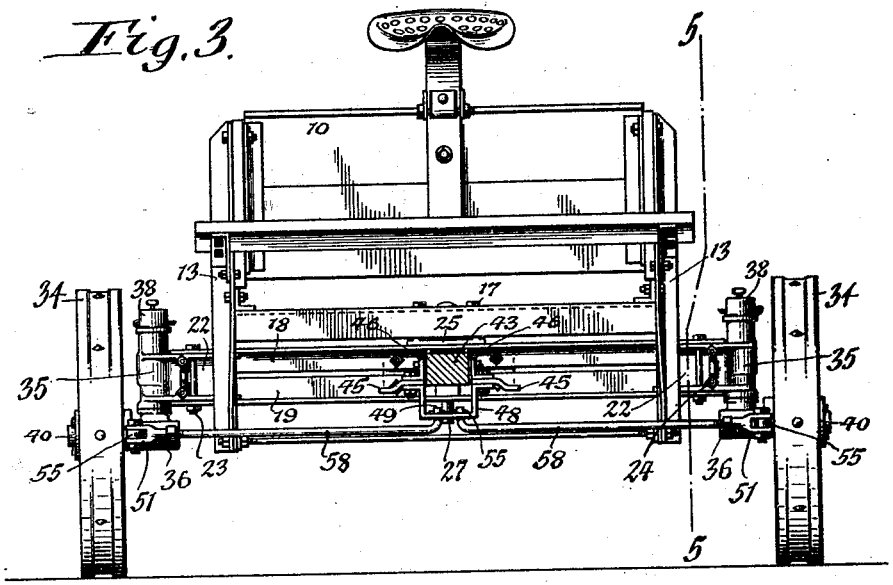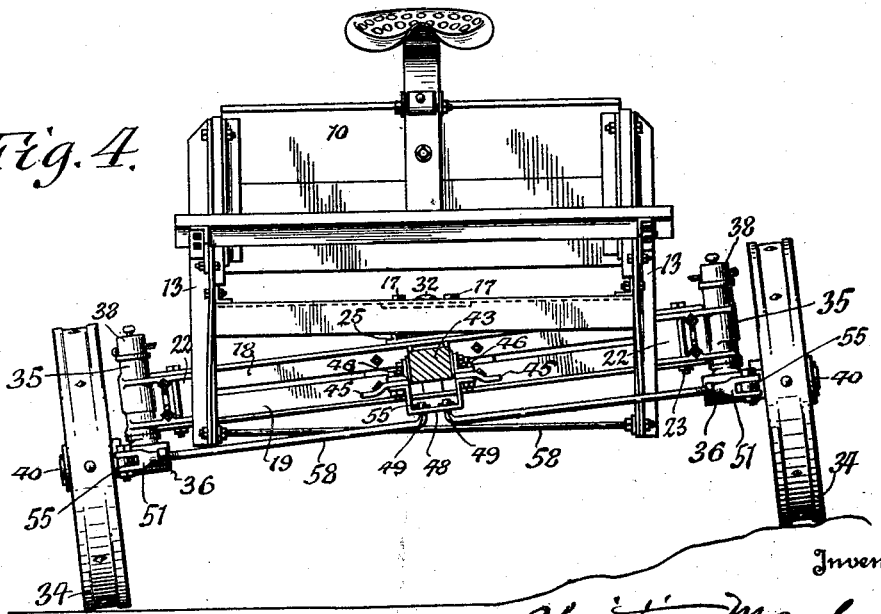

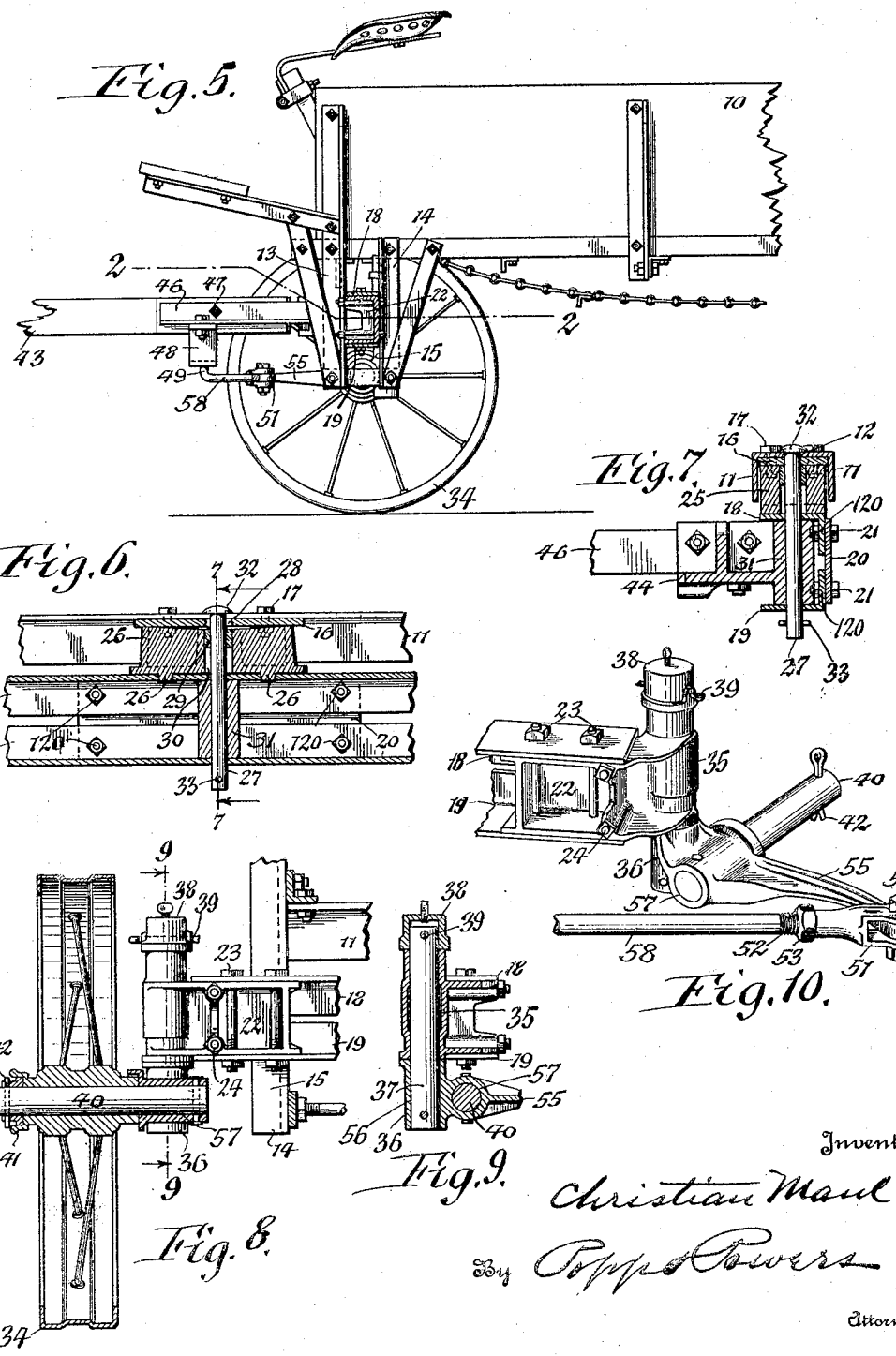

Patented Aug. 23, 1932

1,873,444

UNITED STATES PATENT OFFICE

CHRISTIAN MAUL, OF BATAVIA, NEW YORK, ASSIGNOR TO THE MASSEY-HARRIS CO., INC., OF BATAVIA, NEW YORK, A CORPORATION OF NEW YORK

RUNNING GEAR FOR MANURE SPREADERS OR OTHER VEHICLES

Application filed January 20, 1930. Serial No. 421,999.

This invention relates to a running gear for vehicles and more particularly to the front part of a running gear for manure spreaders. Running gears of this character as heretofore constructed were usually unduly high which made loading of the material into the box difficult, the front axle was constantly subjected to a torsion strain which caused the same to bind in its tilting movement and prevent free action of the parts relative to each other, and the steering wheels were also so mounted that the vehicle could not make the required short turns.

The objects of this invention are to provide a running gear for vehicles of this character in which the organization and mounting of the front axle, bolster and steering mechanism is such that the cargo box can be arranged much lower and therefore loaded more easily than heretofore, that the front axle is relieved from torsional strains and free to tilt relative to the front bolster and box without any cramping action, and that the steering wheels can turn closer toward the box on the inturn side of the same and thus make a shorter turn when this is necessary in the field or elsewhere.

In the accompanying drawings:

Figure 3 is a front elevation of the manure spreader showing both steering wheels on a level and the tongue or draft pole in section.

Figure 4 is a similar view showing the steering wheels resting on different levels.

Figure 5 is a vertical longitudinal section taken on line 5—5 of Fig. 3.

Figure 6 is a fragmentary vertical transverse section, on an enlarged scale, taken on line 6—6 of Fig. 2.

Figure 7 is a vertical section taken on line 7—7 of Fig. 6.

Figure 8 is a fragmentary vertical transverse section, on an enlarged scale, taken on line 8—8 of Fig. 1, looking rearwardly.

Figure 9 is a vertical section taken on line 9—9 of Fig. 8.

Figure 10 is a perspective view of part of the steering mechanism associated with the front axle.

In the following description similar characters of reference indicate like parts in the several figures of the drawings.

Figure 1:
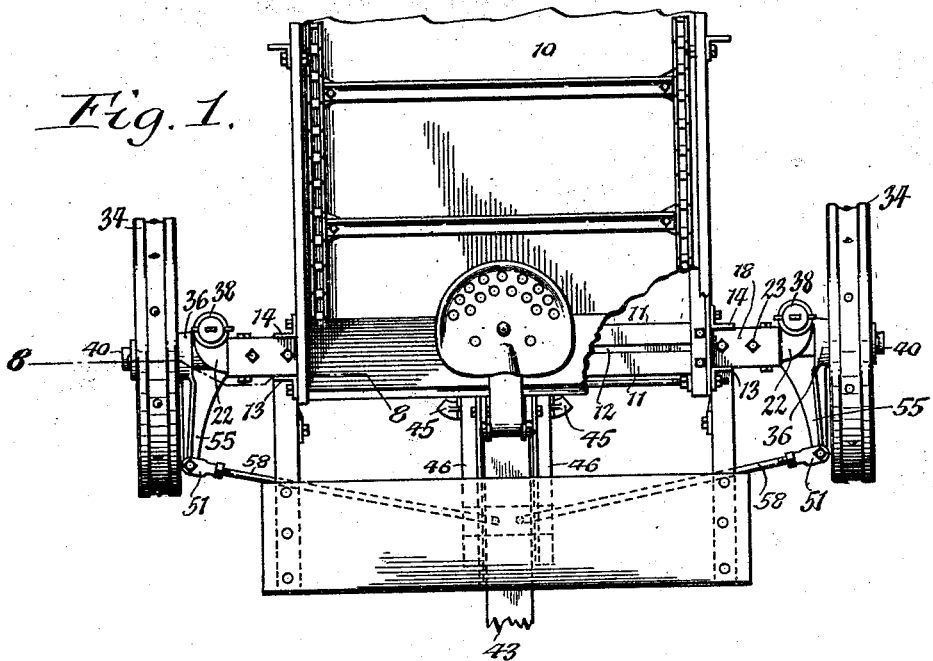
Figure 1 is a top plan view of the front part of a manure spreader or distributor embodying my improvements, showing the steering wheels straight.
Figure 2:
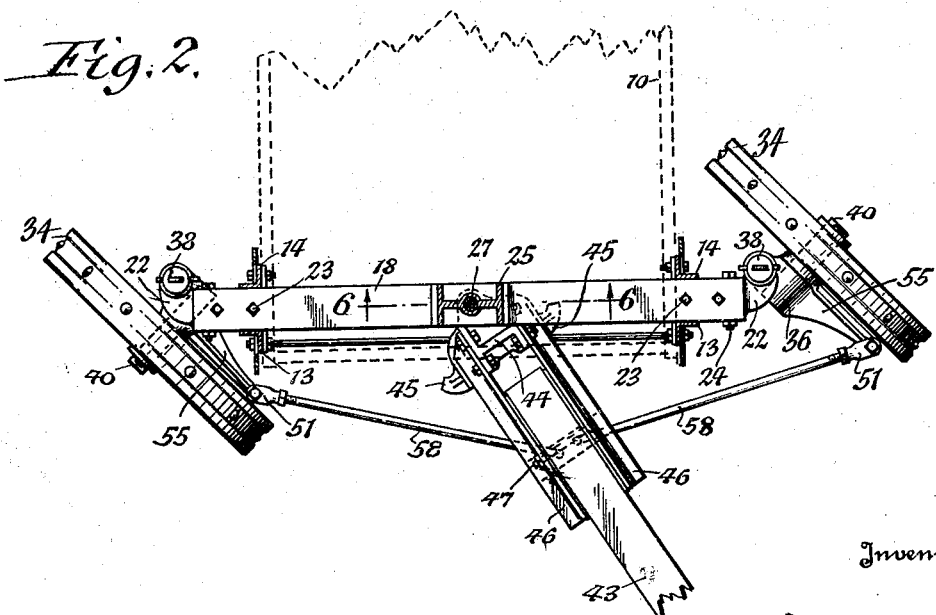
Figure 2 is a horizontal section taken on line 2—2 of Fig. 5, showing the steering wheels and associated parts turned to one side.

Although this running gear may be advantageously employed in various forms of vehicles the same is primarily intended for use in connection with a manure spreader having a cargo box or receptacle 10 which is adapted to contain a load of fertilizer and from the rear end of which the material is discharged and scattered by any suitable means. Below the front part of the box is arranged a front bolster which in its preferred form comprises two angle irons 11, 11 arranged transversely side by side with their inner sides facing each other and their upper flanges arranged horizontally while their lower flanges are arranged vertically and thereby in effect produce a downwardly opening channel, as shown in Figures 1 and 7. These bolster angle irons are separated to form a longitudinal slot 12 between them and at opposite ends these angle irons are secured to two pairs of vertical guide bars 13, 14 projecting downwardly from the box and the space between each pair of bars 13, 14 forming a vertical guideway 15 below the bolster, as shown in Fig. 5.

Between the central parts of the bolster angle irons is arranged a king pin plate 16 which is secured to the underside of the horizontal flanges of these angle irons by bolts 17, as shown in Figures 5, 6 and 7, or other suitable fastening.

Below the bolster is arranged the front axle which in its preferred form comprises upper and lower angle irons 18, 19 having their outer flanges arranged horizontally and projecting forwardly and their inner flanges arranged vertically and projecting toward each other so that in effect these two axle angle irons together form a forwardly opening channel, as shown in Figs. 1, 2, 5, 6, 7, 8 and 10. The central parts of the axle angle irons are rigidly connected by a vertical plate 20 secured to the outer side of their vertical flanges 120, by bolts 21 or the like and at their outer ends these angle irons are coupled by heads 22 which form part of the steering mechanism and each of which is arranged between the respective ends of the axle angle irons and secured to the horizontal flanges of the same by vertical bolts 23 and to the vertical flanges by horizontal bolts 24, as shown in Fig. 10.

Near its opposite ends the axle passes through the vertical guideways formed by the pairs of bars 13, 14 and upon rocking the axle relatively to the bolster and body as the wheels of the vehicle pass over uneven surfaces the axle slides vertically in these guideways.

To permit of such rocking action the central parts of the axle and bolster are pivotally connected by means which are preferably constructed as follows:

The numeral 25 represents a king pin bearing block arranged between the central parts of the axle and bolster and resting with its underside on top of the upper axle angle iron and engaging its upper side with the underside of the coupling plate 16, as shown in Figs. 6 and 7. Longitudinal movement of this block on the axle is prevented by teats, pins or lugs 26 projecting from the under side of the bearing block into openings in the upper axle angle iron, as shown in Fig. 6. The numeral 27 represents a king bolt or pin which extends vertically through the slot between the bolster angle irons, an opening 28 in the king plate or coupling plate 16, an elastic bushing 29 arranged in a vertical opening 30 in the king bolt bearing block and openings in the horizontal flanges of the axle. The head 32 of the king pin rests on top of the bolster and lifting of the king pin out of the axle and bolster is prevented by a cotter 33 passing through the king pin below the axle. As the axle rocks vertically the bearing block 25 tilts on the coupling plate 16, the opening 29 in the latter being sufficiently large to permit the bolt 27 to play therein during such movement and the bushing 29 yielding to requisite extent to avoid any cramping action.

Normally the axle and bolster are parallel, as when running the vehicle on an even road, as shown in Figs. 1, 6 and 8, but when running the same over an uneven surface, as shown in Fig. 4, the axle is tilted at an angle to the bolster. In order to permit the axle to assume this tilted position the inside width of the bolster is made somewhat greater than the outside width of the axle, as shown in Fig. 7, whereby upon tilting the axle and bolster one relatively to the other these members can telescope or lap one over the other the requisite extent to effect such tilting action.

By thus constructing the axle and bolster that they can pass by one another to a limited extent it is possible to build the running gear much lower and thus reduce the distance from the ground to the top of the box whereby loading of the material into the box can be effected more easily and liability of tipping on hill sides is reduced to a minimum. This running gear is therefore particularly well suited for use in manure spreaders the boxes of which are usually loaded with material by hand labor and any reduction in the height of the manure spreader as a whole therefore effects a saving of much labor.

The numeral 34 represents the front or steering wheels of the vehicle which are mounted on opposite ends of the axle in accordance with this invention so as to prevent any torsional action on the axle and also to permit of making a shorter turn of the vehicle. The means for mounting each of the steering wheels on the axle for accomplishing this purpose are constructed as follows:—

The numeral 35 represents an upright bearing formed on the outer part of each bearing block 22 and arranged with its vertical axis in rear of the longitudinal center of the axis, as shown in Figs. 1, 2, 8, 9 and 10. Below each end of the axle is arranged a steering head or knuckle 36 one part of which is provided with an upright pivot pin 37 projecting upwardly through and journaled in the bearing 35 of the respective bearing block and held therein by a cap 38 secured to the upper end of the pin 37 by a cotter 39 and engaging the upper end of the bearing 35. Another part of the steering head is provided with a laterally projecting axle arm 40 upon which the hub of the respective wheel turns and is confined by a collar 41 and cotter 42. Normally when the vehicle is running straight the axle arms are arranged parallel or in line with a vertical plane extending lengthwise through the center of the axle and bolster, as shown in Figs. 1, 5 and 9, thereby avoiding any torsion or twisting action on the axle. As the steering heads rotate on the axle bearing blocks for making a turn one of the axle arms swings rearwardly and the other forwardly relatively to the axle so that the pressures are again balanced and the axle is relieved of any torsion action.

By thus preventing the axle from twisting or developing any torque the same is constantly maintained in an upright position in its vertical guideways 15 and prevented from binding therein thereby insuring freedom in its tilting movements in response to variations in the level of the surface traversed by the vehicle and resulting in easy riding and reduced wear.

By setting the axes of the vertical pivotal connections between the steering heads and axle bearing blocks in rear of the longitudinal center line of the axle, the inner end of the axle arm of the inwardly turning wheel is moved outwardly away from the box while the outer end of the other axle arm is swinging toward the box thereby permitting of a greater range of inward swinging movement of the inturning steering wheel before the wheel strikes the box and enabling the vehicle to make a much shorter turn than otherwise would be possible. While the inturning steering wheel is swinging bodily toward the inturned side of the vehicle the outturning steering wheel is swinging around the box toward the front end thereof where there is ample room and no interference with the steering action. Such short turning of the vehicle is particularly desirable in manure spreaders which when operating in a field should turn as short as possible to avoid unnecessary carrying of the load.

Various means may be employed for turning the steering wheels in unison in opposite directions those shown in the drawings being suitable and constructed as follows:

Pivotally mounted on the central part of the axle is a yoke or frame for supporting a draft pole or tongue 43. In its preferred form this yoke or frame comprises a pivot block 44 provided on its rear side with a vertical pivot eye 31 which is arranged between the horizontal flanges of the axle angle irons and receives the king bolt or pin 27 whereby this block is pivotally connected with the axle, and two stop lugs 45 arranged on opposite sides of this block and adapted to engage the front side of the vertical flanges of the axle angle irons for limiting the swinging movement of the pole or tongue.

Extending forwardly from opposite sides of the pivot block 44 are two longitudinal side bars 46 which receive between them the rear part of the draft pole or tongue 43 which latter is pivotally secured thereto by a horizontal bolt 47 to permit of a vertically swinging movement. Adjacent to their front ends the side bars 44 are connected on their under side by a cross bar or strap 48 which is provided on opposite sides of its center with pivot openings which receive the upturned pivot pins 49 on the inner ends of two steering or shifting rods 58 arranged on opposite sides of the pole. Each of the steering heads is provided with a forwardly projecting steering arm 55 which is adjustably connected with the steering rod on the corresponding side of the vehicle by a fork 51 connected by a screw joint 52 with the outer end of the respective steering rod and held in its adjusted position by a screw nut 53 while this fork straddles the respective steering arm and is pivotally connected therewith by a vertical pivot bolt 54, as best shown in Figs. 1, 2, 3, 4, 5 and 10. The pivot pins are retained in the cross bar 48 by cotters 50 extending through these pins above this bar, as shown in Figs. 3 and 4.

Upon turning the pole horizontally one way or the other from its central position this movement is transmitted by the pole frame, steering rods and steering arms to the steering heads for causing the wheels to turn and steer the vehicle accordingly. Each steering head is formed integrally with the socket 56 in which the lower end of the respective pivot pin 37 is secured and also in one piece with the companion steering arm and the socket 57 in which the inner end of the respective axle arm 40 is secured, thereby materially simplifying the construction, reducing the number of parts, and minimizing the liability of getting out of order.

I claim as my invention:

1. A running gear for vehicles comprising an axle, a bolster arranged above the axle and having two angle irons provided with horizontal flanges which oppose each other, a plate connecting the central parts of said horizontal flanges, a king pin block interposed between the top of said axle and the underside of said plate and provided with a vertical opening, an elastic bushing arranged in said opening and a king pin passing through said plate, bushing and axle.

2. A running gear for vehicles comprising an axle, a bolster arranged above the axle and having two angle irons provided with horizontal flanges which oppose each other, a plate connecting the central parts of said horizontal flanges, a king pin block interposed between the top of said axle and the under side of said plate and provided with a vertical opening, an elastic bushing arranged in said opening, a pole supporting member arranged on the central part of the axle, and a king pin passing through said plate, axle member and bushing.

3. A running gear for vehicles comprising an axle, a bolster arranged above the axle and having two angle irons provided with horizontal flanges which oppose each other, a plate connecting the central parts of said horizontal flanges, a king pin block interposed between the top of said axle and the underside of said plate and provided on its underside with retaining pins entering said axle, and a king pin passing through said plate, block and axle.

4. A running gear for vehicles comprising an axle, steering heads arranged at opposite ends of said axle and each turning horizontally thereon about a vertical axis arranged in rear of the longitudinal center of said axle, and wheels arranged on the outer side of the steering heads and each turning vertically on the respective head about a horizontal axis which normally is arranged in front of said vertical axis and in line with said axle, whereby upon turning the wheels horizontally in one direction one of the wheels will be moved bodily rearwardly and outwardly relative to the axle and the other wheel will be moved bodily forwardly and inwardly relative to the axle.

In testimony whereof I affix my signature.

CHRISTIAN MAUL.